(12) United States Patent
Schneider et al.

(10) Patent No.: US 10,208,779 B2
(45) Date of Patent: Feb. 19, 2019

(54) ASSEMBLY UNIT HAVING AN ASSEMBLY PART AND A SLEEVE FIXED THEREIN

(71) Applicant: RICHARD BERGNER VERBINDUNGSTECHNIK GMBH & CO. KG, Schwabach (DE)

(72) Inventors: Wilhelm Schneider, Rednitzhembach (DE); Judith Klein, Schwabach (DE); Georg Hirschmann, Windsbach (DE)

(73) Assignee: Richard Bergner Verbindungstechnik GmbH & Co. KG, Schwabach (DE)

( * ) Notice: Subject to any disclaimer, the term of this patent is extended or adjusted under 35 U.S.C. 154(b) by 173 days.

(21) Appl. No.: 15/273,955

(22) Filed: Sep. 23, 2016

(65) Prior Publication Data

US 2017/0082126 A1   Mar. 23, 2017

(30) Foreign Application Priority Data

Sep. 23, 2015 (DE) ........................ 10 2015 012 159

(51) Int. Cl.
| | |
|---|---|
| *F16B 43/02* | (2006.01) |
| *F16B 5/02* | (2006.01) |
| *F16B 39/00* | (2006.01) |
| *F16B 39/26* | (2006.01) |

(52) U.S. Cl.
CPC .......... *F16B 5/0258* (2013.01); *F16B 5/0241* (2013.01); *F16B 39/00* (2013.01); *F16B 43/02* (2013.01); *F16B 39/26* (2013.01)

(58) Field of Classification Search
CPC .... F16B 5/0208; F16B 5/0241; F16B 5/0258; F16B 37/04; F16B 39/00; F16B 39/26; F16B 43/001; F16B 43/02

USPC ....... 411/103, 108, 353, 367, 383, 517, 521, 411/546

See application file for complete search history.

(56) References Cited

U.S. PATENT DOCUMENTS

| | | | | |
|---|---|---|---|---|
| 3,027,670 | A * | 4/1962 | Kramer ................ | A47G 33/004 24/694 |
| 4,435,111 | A * | 3/1984 | Mizusawa ........... | F16B 37/0842 411/21 |
| 5,026,233 | A * | 6/1991 | Carothers ............. | F16B 37/122 411/177 |
| 6,582,171 | B2 * | 6/2003 | Bondarowicz .......... | F16B 21/18 411/353 |
| 7,059,022 | B2 * | 6/2006 | Yuta ...................... | B60R 13/011 24/297 |
| 8,066,465 | B2 * | 11/2011 | Figge ...................... | F16B 5/025 411/34 |
| 8,202,031 | B2 * | 6/2012 | Hartmann ............. | F16B 41/002 411/353 |

(Continued)

*Primary Examiner* — Roberta S Delisle
(74) *Attorney, Agent, or Firm* — Laurence A. Greenberg; Werner H. Stemer; Ralph E. Locher

(57) ABSTRACT

An assembly unit includes an assembly part penetrated by a through opening and a cylindrical sleeve which is captively fixed in the through opening. The sleeve has at least one spring element which protrudes from an external face of the sleeve by an excess length in a non-assembled state. The excess length is dimensioned such that the spring element is elastically moved radially inward by contact with the wall of the through opening when the sleeve is introduced into the through opening, so that the spring element presses against the wall 4 of the through opening as a result of elastic restoring forces.

10 Claims, 4 Drawing Sheets

(56) References Cited

U.S. PATENT DOCUMENTS

| | | | | |
|---|---|---|---|---|
| 8,202,033 B2* | 6/2012 | Choi | .................... | B62D 25/147 |
| | | | | 411/535 |
| 8,210,784 B2* | 7/2012 | Hartmann | ............. | F16B 41/002 |
| | | | | 411/353 |
| 8,651,788 B1* | 2/2014 | Budde | ................... | F16B 5/0233 |
| | | | | 411/535 |

* cited by examiner

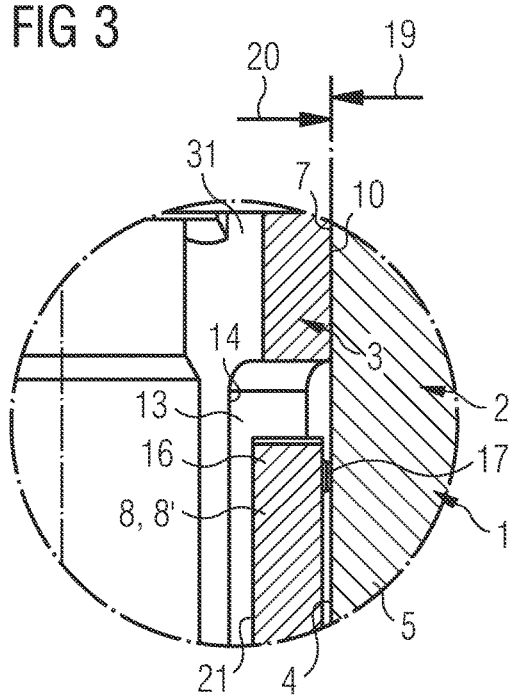
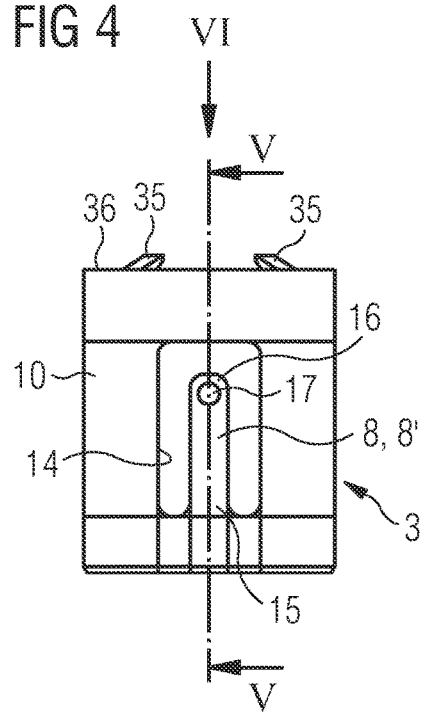

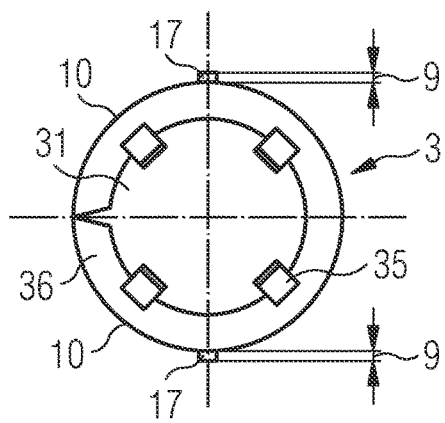
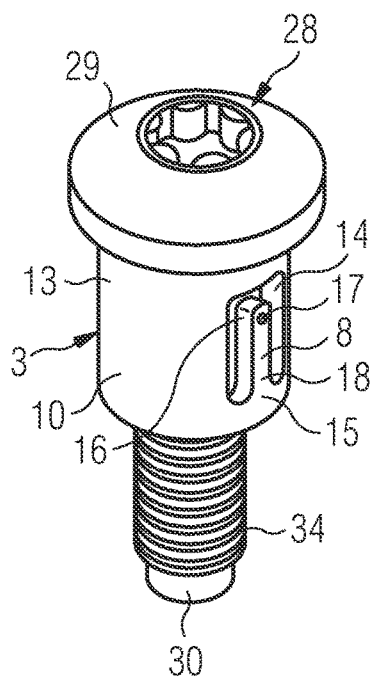
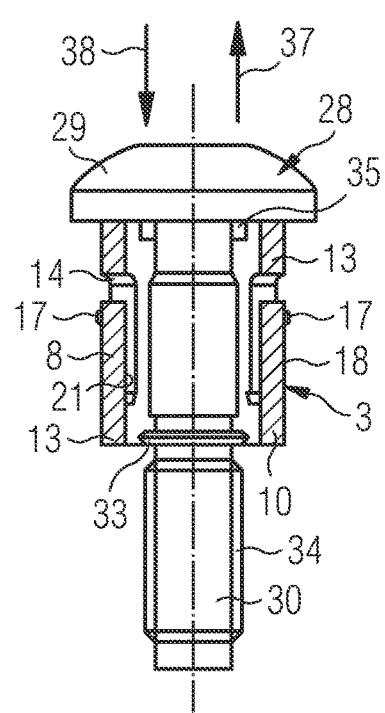

ASSEMBLY UNIT HAVING AN ASSEMBLY PART AND A SLEEVE FIXED THEREIN

CROSS-REFERENCE TO RELATED APPLICATION

This application claims the priority, under 35 U.S.C. § 119, of German Patent Application DE 10 2015 012 159.6, filed Sep. 23, 2015; the prior application is herewith incorporated by reference in its entirety.

BACKGROUND OF THE INVENTION

Field of the Invention

The invention relates to an assembly unit including an assembly part and a sleeve. The assembly part, in very general terms, is an add-on part which is respectively provided for assembly on or fixing by way of at least one screw to a substructure. For that purpose, the assembly part has at least one through opening in which a screw may be plug-fitted and screwed into the basic structure. Plastics materials such as polyphenylene sulfide (PPS), which have a high resistance to chemicals, a high dimensional stability at heat, and rigidity are employed not the least of which for saving weight, for example, in the case of cooling systems for the engine bay of automobiles, that is to say in the case of so-called thermal management.

For various reasons it may be necessary for a sleeve of a material that is stronger in comparison to the plastics material of the assembly part to be captively fixed in the through opening of the assembly part. To this end, a metallic sleeve with a defined oversize in relation to the through opening is usually press-fitted into the latter. In the case of production-related cumulative tolerances of the sleeve and of the through opening, significant surpassing of the predefined oversize and, as a consequence, respective bursting of the through opening or of one of the material regions made from a plastics material of the above-mentioned type of the assembly part that encircles the through opening may arise.

In the case of assembly parts made from a comparatively stronger material such as aluminum or magnesium alloys, press-fitting of the sleeve in the through opening is not possible in the case of the predefined oversize being surpassed because the resilience of the material is only minor.

In order for the stated problems to be avoided it is customary for sleeves which are rolled from a sheet-metal strip and which have a defined axial gap between the sheet-metal ends thereof to be used. Such sleeves are capable of reducing the diameter thereof when respectively penetrating an excessively tight through opening or a through opening having an excessive undersize while the axial gap of the sleeves are reduced.

SUMMARY OF THE INVENTION

It is accordingly an object of the invention to provide an assembly unit having an assembly part and a sleeve fixed therein, which overcomes the hereinafore-mentioned disadvantages of the heretofore-known units of this general type and which has an alternative construction.

With the foregoing and other objects in view there is provided, in accordance with the invention, an assembly unit, comprising an assembly part penetrated by a through opening defining a wall of the through opening, and a cylindrical sleeve being captively fixed in the through opening. The cylindrical sleeve has an external face and at least one spring element protruding from the external face by an excess length in a non-assembled state. The excess length is dimensioned to cause the at least one spring element to be elastically moved radially inward by contact with the wall of the through opening upon the cylindrical sleeve being introduced into the through opening, causing the at least one spring element to press against the wall of the through opening as a result of elastic restoring forces.

In the case of this assembly unit, captive fixing of the sleeve in the through bore of the assembly part is guaranteed in that the sleeve has at least one spring element which in the non-assembled state, that is to say when the sleeve is still located outside the through opening, protrudes from the external shell face of the sleeve by an excess length, wherein the excess length is dimensioned in such a manner that the spring element is elastically moved radially inward by contact with the wall of the through opening when the sleeve is introduced into the through opening, such that the spring element presses against the wall of the through opening as a result of elastic restoring forces. With a view to a respective positionally precise or a central configuration of the sleeve in the through opening, it is expedient herein for a plurality of spring elements which are uniformly distributed in the circumferential direction of the sleeve to be provided.

In the case of an assembly unit according to the invention, unlike that of a sleeve having an axial slot, the force locking by way of which the sleeve is held in the through bore is not caused by an entire elastically deformed sleeve wall, but only by one or a plurality of elastically deformed spring elements. It is thus possible in the case of the invention for the forces that are exerted by the spring elements to be adjusted in a manner independent of the thickness of the wall and of the material of the sleeve in that, for instance, dimensioning of the spring elements in terms of thickness, length, and width is varied. In this way, the wall thickness of the sleeve, for example, for instance when the latter serves as a spacer, that is to say when it is to be impinged by a screw head, may be correspondingly dimensioned without any effect on the spring forces in question. In the case of the use of a slotted sleeve, this would not be possible without also varying the spring effect of the sleeve.

A further advantage of the assembly unit according to the invention lies in that the spring elements may be adapted by corresponding deforming to a through opening that deviates from the cylindrical-shell form and may guarantee a captive configuration of the sleeve in the through opening. Such a case is present in the case of an assembly part that is manufactured by the injection-molding method, for example. In this case, for manufacturing reasons, the through opening has a draft angle, that is to say that the wall of the former runs in a slightly conical manner.

Other features which are considered as characteristic for the invention are set forth in the appended claims.

Although the invention is illustrated and described herein as embodied in an assembly unit having an assembly part and a sleeve fixed therein, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 3 is an enlarged view of the portion I of FIG. 1;

FIG. 4 is a lateral view of a sleeve;

FIG. 5 is a longitudinal-sectional view of the sleeve, which is taken along a section line V-V of FIG. 4, in the direction of the arrows;

FIG. 6 is a plan view taken along the direction of an arrow VI in FIG. 4;

FIG. 7 is a perspective view of a fastening unit which is formed from one sleeve and one screw;

FIG. 8 is a longitudinal-sectional view of the fastening unit of FIG. 7; and

DETAILED DESCRIPTION OF THE INVENTION

Figure 1:
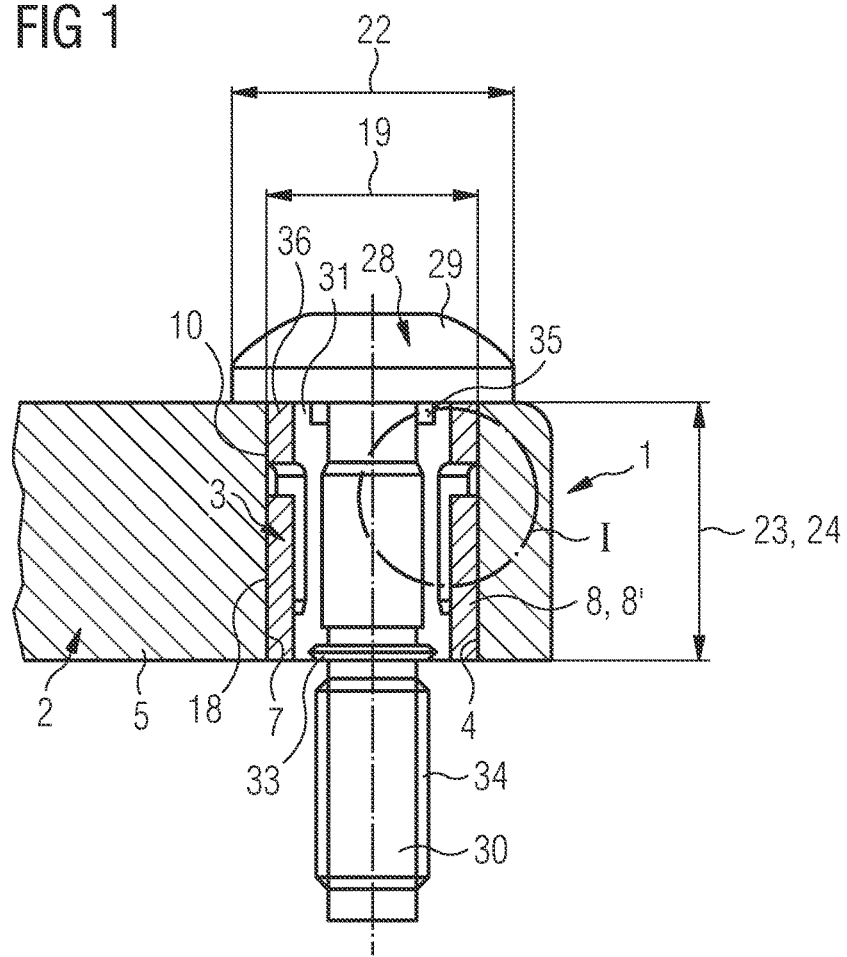
FIG. 1 is a fragmentary, diagrammatic, partially sectional view of an assembly unit equipped with a screw.
Figure 2:
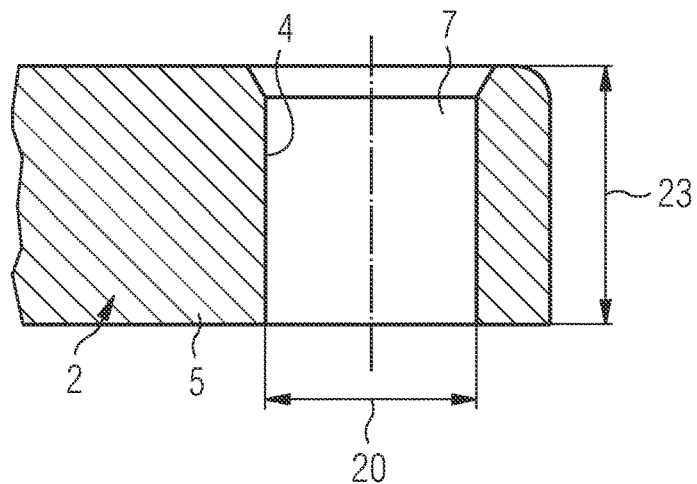
FIG. 2 is a fragmentary, sectional view of an assembly part, in which no sleeve has as yet been located in a through opening of the assembly part.
Figure 9:
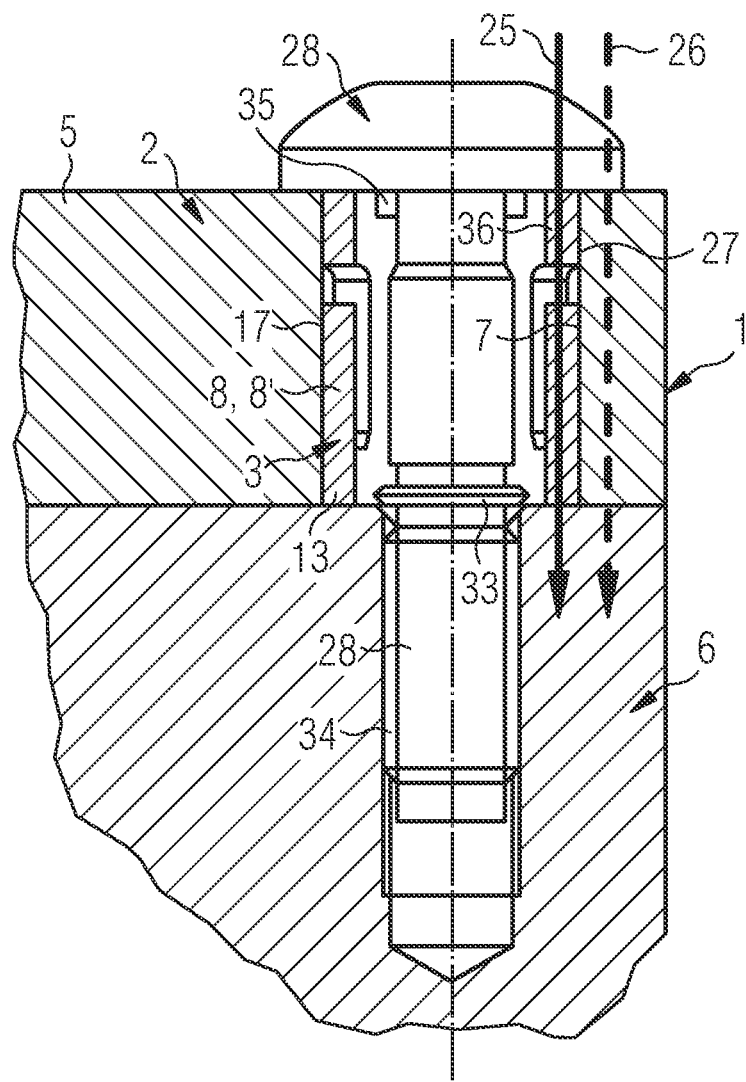
FIG. 9 is an elevational view of an assembly unit fixed to a substructure.

Referring now to the figures of the drawings in detail and first, particularly, to FIGS. 1 and 9 thereof, there is seen an assembly unit 1 including an assembly part 2 which is made, for example, from a plastics material such as PPS, and a cylindrical sleeve 3. The assembly part 2 is a cover-type add-on part, for example, provided with a peripheral flange 5, which is provided for fixing to a substructure 6 such as a component of an automobile. The flange 5 is penetrated by a plurality of through openings 7, only one of which is shown in each of the drawings. The sleeve 3 and the through opening 7 preferably have mutually complementary cross-sectional shapes and are in particular constructed to be circular-cylindrical. The sleeve 3 is captively fixed in the through opening 7.

In order for the captive fixing to be established, the sleeve 3 has a plurality of spring elements 8 which are uniformly distributed in the circumferential direction. In the non-assembled state, that is to say when the sleeve 3 is not yet located in the through opening 7, the spring elements 8 protrude by an excess length 9 (FIGS. 5, 6) from the external face 10 of the sleeve. The external face 10 runs on a cylinder-shell face. The excess length 9 is dimensioned in such a manner that when the sleeve 3 is introduced into the through opening 7, the spring element 8 is elastically moved radially inward by contact with a wall 4 of the through opening 7 in such a way that the spring element 8 presses against the wall 4 of the through opening 7 as a result of elastic restoring forces.

As can be readily derived in particular from FIG. 7, the spring elements 8 are cut cleanly from a wall 13 of the sleeve 3. In terms of production technology, this may be readily established if and when the sleeves are sleeves 3 which are rolled from a non-illustrated sheet-metal strip. The spring elements 8 may then be produced by punching which is readily performable on the sheet-metal strip. A U-shaped clearance 14 is preferably produced by punching in the respective sheet-metal strip or sleeve wall 13. Accordingly, the spring elements 8 are configured in the form of spring arms 8' which extend in the axial direction of the sleeves 3. The spring arms 8' have an end 15, integrally configured with the sleeve wall 13, and a free end 16. The holding force by way of which the sleeve 3 is held in the through opening 7 may be adjusted by varying the thickness, length, or width, and the number of spring elements, there being two diametrically opposite spring arms 8' present in the exemplary embodiment.

In order for the spring elements 8 to press against the wall 4 of the through opening 7 by virtue of elastic restoring forces, the above-mentioned excess length 9 is necessary. The latter may be produced by a radially outwardly directed plastic deformation of the spring elements 8. In the case of spring arms 8' this may be performed in such a way that the free ends 16 thereof protrude in a non-illustrated manner from the external face 10 of the sleeve 3 by way of the excess length 9. However, the excess length 9 is preferably produced without any radially outwardly directed deformation of the spring arms 8' for example by way of a burl-shaped protrusion 17 which is present on the external face 18 of the spring arms 8'. The protrusion 17 is manufactured by an embossing which is performed from a rear side 21 of the spring arm 8', for example. The original position of the spring arms 8' herein is not varied, that is to say that the external faces 18 of the spring arms 8' together with the external sleeve face 10 run in a common cylinder-shell face, as can be readily seen in FIG. 6. The protrusion 17 radially protrudes so far outward that the spring arms 8', or at least the free ends 16 thereof, are bent radially inward when the sleeve 3 is introduced into the through opening 7, while developing radially outwardly directed restoring forces.

The sleeve 3 is preferably dimensioned in such a way that it is disposed in the through opening 7 without play. In the case of a circular-cylindrical shape of the sleeve 3 and of the through opening 7, this is the case when the external diameter 19 of the sleeve 3 and the diameter 20 of the through bore 7 are identical or at least approximately identical. The sleeve 3 may then be introduced in a centered manner and with precise fit into the through opening 7. The free ends 16 of the spring arms 8' are deflected therein in a radially inward manner by an amount respectively corresponding to the protrusion 17 or the excess length 9.

The length 23 of the through opening 7 and the length 24 of the sleeve 3 are mutually adapted in such a manner that a screw 28 engages through the sleeve 3 and braces the assembly part 2 relative to the substructure 6 in a primary force-locking connection 25 which impinges the sleeve 3 and in a secondary force-locking connection 26 which impinges a peripheral region 27 of the assembly part 2 that defines the through opening 7. The screw 28 has a head 29 with a diameter 22 that is larger than the diameter 20 of the through opening 7. A comparatively large part of the pre-tensioning force of the screw 28 is thus induced by way of the sleeve 3, and a comparatively small part thereof is in each case induced indirectly or directly into the substructure 6. In the case of a respective direct force impingement, the length 24 of the sleeve is equal to or slightly smaller than the length 23 of the through opening 7.

The screw 28 is preferably connected to the assembly unit 1 in a captive manner. For this purpose, a radially projecting, rearward-engaging element which may be formed by a thread 34 of the screw 28 is present on a shaft 30 of the screw 28 that engages with radial play through the sleeve 3 or an interior space 31 thereof. In the case of the exemplary embodiment shown, the rearward-engaging element is an annular beading 33 which projects radially from the shaft 30 between the head 29 and the thread 34. The respective rearward-engaging element or annular beading 33, in the sense of a form-locking connection which is effective in the axial direction 37, interacts with radially inward protruding protrusions 35 on an end side 36 of the sleeve 3 that faces the head 29 (FIG. 8). In an opposite direction 38, the screw 28 is held in the sleeve 3 due to the head 29 radially protruding beyond the through opening 7.

The invention claimed is:
1. An assembly unit, comprising:
an assembly part penetrated by a through opening defining a wall of said through opening; and
a cylindrical sleeve being captively fixed in said through opening;
said cylindrical sleeve having an external face and a wall;
said cylindrical sleeve having at least one spring element being cut free from said cylindrical sleeve wall and protruding from said external face by an excess length in a non-assembled state;
said spring element being a spring arm having an end integrally connected to said cylindrical sleeve wall and a free end pressing against said wall of said through opening;
said spring arm having an external face and said spring arm having a protrusion disposed on said free end of said spring arm and protruding from said external face of said spring arm; and
said excess length being dimensioned to cause said at least one spring element to be elastically moved radially inward by contact with said wall of said through opening upon said cylindrical sleeve being introduced into said through opening, causing said at least one spring element to press against said wall of said through opening as a result of elastic restoring forces.
2. The assembly unit according to claim 1, wherein said cylindrical sleeve has an external cylinder-shell face, and said spring element has an external face running in said external cylinder-shell face of said cylindrical sleeve.

3. The assembly unit according to claim 1, wherein said cylindrical sleeve and said through opening have a mutually complementary cross-sectional shape.
4. The assembly unit according to claim 3, which further comprises:
a screw engaging through said through opening, said screw bracing said assembly part relative to a substructure and said screw having a head;
said assembly part having a peripheral region defining said through opening; and
said through opening and said cylindrical sleeve having lengths being mutually adapted to cause said head of said screw to impinge said cylindrical sleeve in a primary force-locking connection and to impinge said peripheral region of said assembly part in a secondary force-locking connection.
5. The assembly unit according to claim 1, wherein said cylindrical sleeve is wound from a sheet-metal strip.
6. The assembly unit according to claim 5, wherein said at least one spring element is cut free in said sheet-metal strip.
7. The assembly unit according to claim 1, which further comprises a screw engaging through and being captively fixed in said through opening.
8. The assembly unit according to claim 1, wherein said external face of said spring arm and said external sleeve face run in a common cylinder-shell face, and said protrusion extends radially outwardly from an envelope of said external cylinder-shell face and said spring arm.
9. The assembly unit according to claim 1, wherein said protrusion is burl-shaped.
10. The assembly unit according to claim 1, wherein said protrusion is an embossing formed from a rear side of said spring arm.

* * * * *